US012579468B2

(12) United States Patent (10) Patent No.: US 12,579,468 B2
Yamamoto et al. (45) Date of Patent: Mar. 17, 2026

(54) TRAINING DATA SCREENING DEVICE, ROBOT SYSTEM, AND TRAINING DATA SCREENING METHOD

(71) Applicant: Kawasaki Jukogyo Kabushiki Kaisha, Kobe (JP)

(72) Inventors: Takeshi Yamamoto, Kobe (JP); Hitoshi Hasunuma, Kobe (JP); Kazuki Kurashima, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 842 days.

(21) Appl. No.: 17/789,227

(22) PCT Filed: Dec. 22, 2020

(86) PCT No.: PCT/JP2020/048038
§ 371 (c)(1),
(2) Date: Jun. 27, 2022

(87) PCT Pub. No.: WO2021/132281
PCT Pub. Date: Jul. 1, 2021

(65) Prior Publication Data
US 2023/0045162 A1 Feb. 9, 2023

(30) Foreign Application Priority Data
Dec. 27, 2019 (JP) .................................. 2019-238564

(51) Int. Cl.
*G06N 20/00* (2019.01)
(52) U.S. Cl.
CPC .................................. *G06N 20/00* (2019.01)

(58) Field of Classification Search
CPC .......... G06N 20/00; G06N 3/04; G06N 3/084; G06N 3/09; G05B 2219/39314; G05B 2219/40032; G05B 2219/40515; B25J 9/163; B25J 9/1656
See application file for complete search history.

(56) References Cited

U.S. PATENT DOCUMENTS

2019/0121303 A1* 4/2019 Okadome .............. G05B 13/04
2019/0152054 A1 5/2019 Ishikawa et al.
2020/0139539 A1 5/2020 Hasunuma et al.

FOREIGN PATENT DOCUMENTS

JP 2018-206286 A 12/2018
JP 2019-79157 A 5/2019

* cited by examiner

*Primary Examiner* — Pei Yong Weng
(74) *Attorney, Agent, or Firm* — XSENSUS LLP

(57) ABSTRACT
A training data screening device includes a data evaluation model, a data evaluator, a memory, and a training data screener. The data evaluation model is constructed by machine learning on at least a part of the collected data, or by machine learning on data different from the collected data. The data evaluator evaluates the input collected data using the data evaluation model. The memory stores the evaluated data, which is the collected data evaluated by the data evaluator. The training data screener screens the training data tier constructing the learning model from the evaluated data stored by the memory by an instruction of an operator to whom an evaluation result of the data evaluator is presented, or automatically screens the training data based on the evaluation result.

12 Claims, 6 Drawing Sheets

FIG. 1

FIG. 2 work state A (airborne)

work state B (contact)

work state C (insertion)

work state D (completion)

FIG. 3 operation information time t (sec)

data evaluation model operation information time t (sec)

Figure 3:
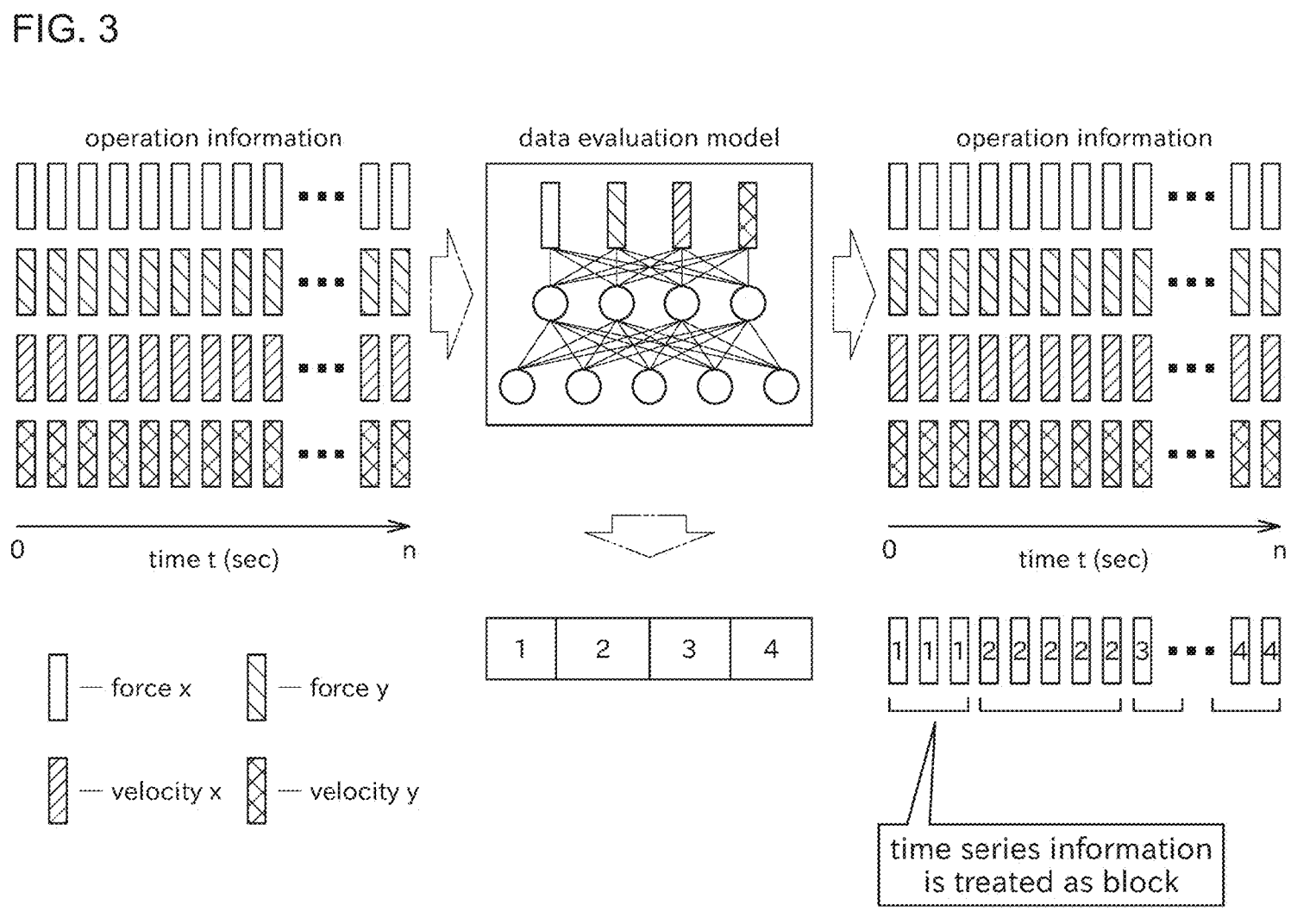

time series information is treated as block

— force x    — force y

— velocity x    — velocity y

| | portion similar to reference operation corresponding to work state A |
| 1 | |
| 2 | portion similar to reference operation corresponding to work state B |
| 3 | portion similar to reference operation corresponding to work state C |
| 4 | portion similar to reference operation corresponding to work state D |

TRAINING DATA SCREENING DEVICE, ROBOT SYSTEM, AND TRAINING DATA SCREENING METHOD

CROSS-REFERENCE TO RELATED APPLICATIONS

The present application is based on PCT filing PCT/JP2020/048038, filed Dec. 22, 2020, which claims priority to JP 2019-238564, filed Dec. 27, 2019, the entire contents of each are incorporated herein by reference.

TECHNICAL FIELD

This invention relates to screening of training data for training a learning model.

BACKGROUND ART

It has been known of systems that control robot operations and the like, using machine learning, which iteratively learns from collected data to automatically find regularities and rules and achieve functions similar to the natural learning ability of humans. PTL 1 discloses this type of system.

The operation prediction system of PTL 1 is configured to construct operation prediction models by making a plurality of groups obtained by classifying operation case data for learning (collected data) be machine-learned by an operation prediction model corresponding to each group.

PRIOR-ART DOCUMENTS

Patent Documents

PTL 1: Japanese Patent Application Laid-Open No. 2018-206286

SUMMARY OF THE INVENTION

Problems to be Solved by the Invention

Generally, in a system such as PTL 1 that uses machine learning to control the robot operations, the data collected for learning includes both operation data intended by the operator and operation data unintended. The learning model learns the operation data in the collected data, in the same way regardless of whether it is intended by the operator or not.

In the collected data, it is common for the operation data intended by the operator to be considerably more than the operation data unintended. Therefore, it is expected that as the learning process is repeated, the robot will perform operations intended by the operator.

However, since the machine learning model machine-learns even for inappropriate operation data not intended by the operator, it takes a long time for the learning to converge, and it takes a lot of time until the robot can output the result intended by the operator. In addition, in order to determine whether the robot has acquired the operation intended by operator through learning, the operator has to visually check the learned operation by the robot. If the robot does not perform the intended operation even after a long period of training, and if the operation of the robot is not likely to improve in the future, the process would have to be redone from the stage of collecting data, resulting in a large waste of time and effort.

The present invention is made in view of the circumstances described above, and an object of the present invention is to provide a training data screening device that can reduce the time and effort required for trial and error in machine learning, and can supply training data that can reduce the training time until results in accordance with the intended output can be output.

Means for Solving the Problems

The problem to be solved is as described above, and the means to solve this problem and its effects are described below.

A first aspect of the present invention provides a training data screening device configured as follows. That is, this training data screening device screens training data for constructing a learning model by machine learning from collected data collected by a data collector. This training data screening device includes a data evaluation model, a data evaluator, a memory, and a training data screener. The data evaluation model is constructed by machine learning on at least a part of the collected data, or by machine learning on data different from the collected data. The data evaluator evaluates the input collected data using the data evaluation model. The memory is for storing evaluated data, which is the collected data evaluated by the data evaluator. The training data screener screens the training data for constructing the learning model from the evaluated data stored by the memory by an instruction of an operator to whom an evaluation result of the data evaluator is presented, or automatically screens the training data based on the evaluation result.

A second aspect of the present invention provides a training data screening method as follows. That is, this training data screening method is for screening training data for constructing a learning model by machine learning from collected data collected by a data collector. This training data screening method includes a data evaluation step, a storing step, and a training data screening step. In the data evaluation step, the input collected data is evaluated using a data evaluation model constructed by machine learning on at least a part of the collected data, or by machine learning on data different from the collected data. In the storing step, evaluated data, which is the collected data evaluated in the data evaluation step, is stored. In the training data screening step, the training data for constructing the learning model is automatically screened from the evaluated data stored in the storing step, either by an instruction of an operator to whom an evaluation result in the data evaluation step is presented, or based on the evaluation result.

This makes it easy to prepare training data including preferred data for machine learning by screening the training data from the collected data using the evaluation result from the data evaluation model. This reduces the time required to build the learning model.

Effects of the Invention

The invention can reduce the time and effort required for trial and in machine learning, and can supply training data that can reduce the training time until good results can be output.

BRIEF DESCRIPTION OF THE DRAWINGS

FIG. 1 is a block diagram showing the relationship between a training data screening device, a robot system, and a learning device, according to one embodiment of the present invention.

FIG. 2 is a diagram showing an example flow of work performed by a robot and each work state.

FIG. 3 is a diagram illustrating an evaluation of operating information.

EMBODIMENT FOR CARRYING OUT THE INVENTION

Figure 1:
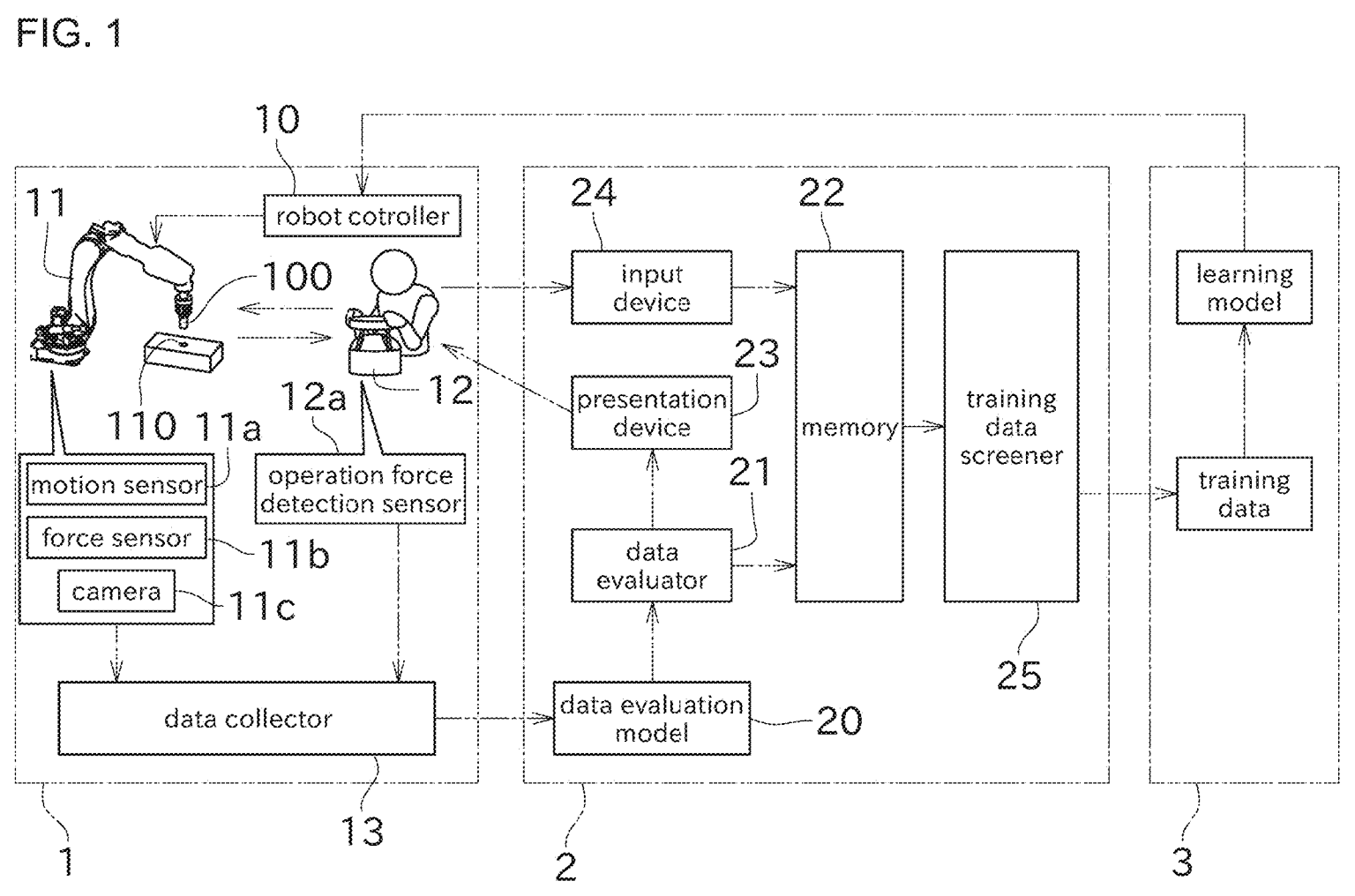
Figure 4:
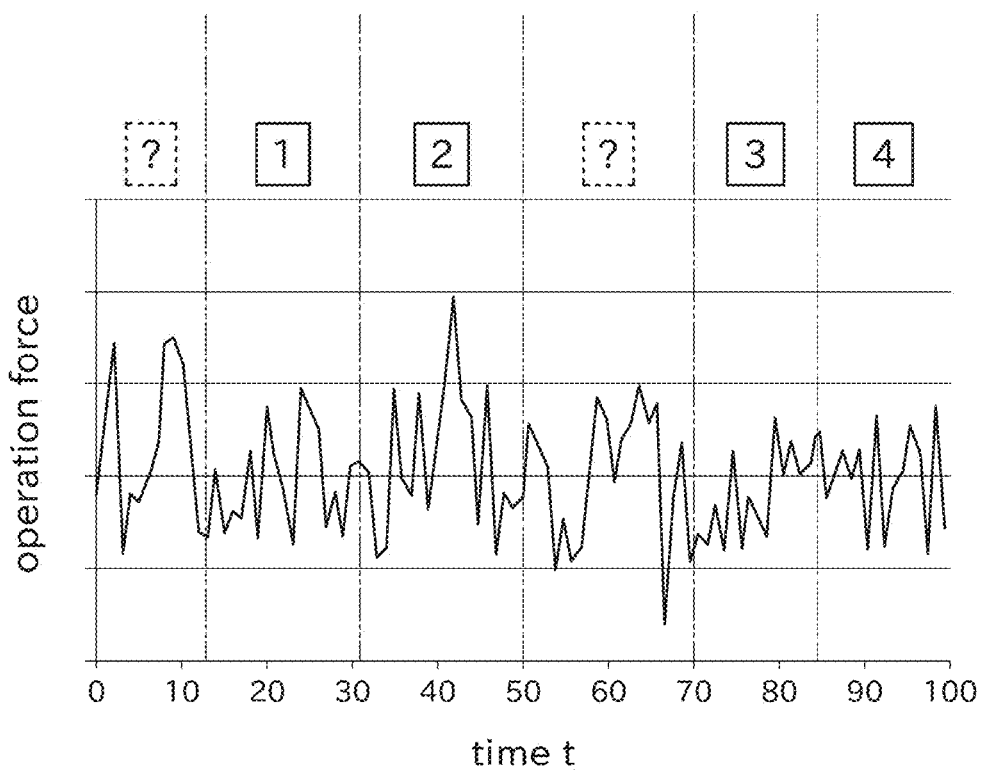
FIG. 4 is a diagram showing an example of data displayed on a display.

Next, the embodiment of the invention will be described with reference to the drawings. First, referring to FIG. 1, a robot system 1 that uses a learning model constructed by machine learning on data screened by a training data screening device 2 of this embodiment, and a learning device 3 that constructs this learning model will be briefly described. FIG. 1 is a block diagram showing the relationship between the training data screening device 2, the robot system 1, and the learning device 3.

The robot system 1 is a system for making a robot 11 perform a work. This work may include, for example, welding, assembling, machining, handling, painting, cleaning, polishing, etc.

As shown in FIG. 1, the robot system (machine to be controlled) 1 includes a robot controller 10, the robot 11, an operation device 12, and a data collector 13. Each of the devices is connected to each other via a wired or wireless network and can exchange signals (data).

The robot controller 10 is configured by a known computer and includes a processor, a robot storage unit, and a communication unit. The processor is a microcontroller, a CPU, an MPU, a PLC, a DSP, an ASIC, an FPGA or the like. The robot storage unit is a ROM, a RAM, an HDD or the like. The communication unit can communicate with external devices. The robot storage unit stores control applications for controlling the arm unit and the like.

The robot controller 10 can switch an operation mode of the robot 11 between a manual operation mode, an automatic operation mode, and an autonomous operation mode.

In the manual operation mode, the operator operates the robot 11 by manually operating the operation device 12 described below.

In the automatic operation mode, the robot 11 operates following a predetermined motion trajectory. This automatic operation mode is used when the same movement is repeated, such as the movement of the end effector, described below, attached to the tip end of the arm unit of the robot 11. This movement of the end effector may be, for example, from a predetermined initial position to a position where autonomous operation in the autonomous operation mode begins.

In the autonomous operation mode, the robot 11 operates automatically based on the results of learning of operations of the robot 11 by manual operations in advance. In the autonomous operation mode in the robot system 1 of this embodiment, the operation of the robot 11 is controlled using a learning model constructed by machine learning on the training data screened by the training data screening device 2 described below.

The robot 11 is configured, for example, as a vertical articulated robot with 6 degrees of freedom of movement. The robot 11 includes an arm unit attached to a pedestal. The arm unit includes a plurality of joints. Each joint is provided with an actuator not shown (for example, an electric motor) to drive the arm unit around the joint. An end effector is attached to the tip end of the arm unit in accordance with the work to be performed.

The arm unit and the end effector of the robot 11 operate based on operation commands to drive the robot 11. These operation commands may include, for example, a command of linear velocity, a command of angular velocity, or the like.

The robot 11 is equipped with sensors for detecting the motion of the robot 11, the surrounding environment of the robot 11, and the like. In this embodiment, a motion sensor 11*a*, a force sensor 11*b*, and a camera 11*c* are attached to the robot 11.

The motion sensor 11*a* includes an encoder, for example. The motion sensor 11*a* is provided at each joint of the arm unit of the robot 11 to detect the angle of rotation or the angular velocity of each joint.

The force sensor 11*b* detects, during the operation of the robot 11, the force applied to each joint of the arm unit of the robot 11 or the end effector attached to the tip end of the arm of the robot 11. The force sensor 11*b* may be configured to detect a moment instead of or in addition to the force.

The camera 11*c* detects images of the workpiece to be worked on (progress of the work on the workpiece). To detect the progress of the work on the workpiece, a sound sensor to detect sound and/or a vibration sensor to detect vibration may be provided instead of or in addition to the camera 11*c*. Furthermore, in order to collect distance information, a sensor such as a laser scan sensor, an infrared scan sensor or the like may be provided with the robot 11 or the like.

The data detected by the motion sensor 11*a* is operation data indicating the operation of the robot 11. The data detected by the force sensor 11*b* and the camera 11*c* is ambient environment data indicating a state of an environment surrounding the robot 11. The ambient environment data includes a state value that indicate a state of the work progress of the robot 11 at the time when the sensors detect the data. The data detected by the motion sensor 11*a*, the force sensor 11*b*, and the camera lie is collected as state information by the data collector 13 described below.

The operation device 12 is a component that is operated by the operator to make the robot 11 operate. The operation device 12 varies depending on the work, but is, for example, a lever that is operated by a hand of the operator or a pedal that is operated by his/her foot. The operation device 12 is configured, for example, as a remote operation device that is physically located away from the robot 11.

The operation device 12 includes an operation force detection sensor 12*a*. The operation force detection sensor 12*a* detects an operation force, which is the force applied to the operation device 12 by the operator. If the operation device 12 is configured to be able to be operated in various directions, the operation force may be represented by a value including a direction and a magnitude of the force, for example, a vector. The operating force may be represented by a value that includes an acceleration or other value that is linked to the force, instead of the force applied by the operator.

In this embodiment, the operation force detected by the operation force detection sensor 12*a* includes, for example, as shown in FIG. 3, a component of a force and a velocity in the x-axis (force x and velocity x) and a component of a force and a velocity in the y-axis (force y and velocity y) in a coordinate system of the robot 11. The data related to the operation force detected by the operation force detection sensor 12a is collected by the data collector 13 as operation information.

The data collector 13 is configured by a known computer and includes a processor, a robot storage unit, and a communication unit. The processor is a microcontroller, a CPU, an MPU, a PLC, a DSP, an ASIC, a FPGA or the like. The robot storage unit is a ROM, a RAM, an HDD or the like. The communication unit can communicate with external devices. The storage unit stores a data collection application that collects various types of data, and the like. The data collector 13 may be provided separately from the robot controller 10 or may be integrated with the robot controller 10. When the data collector 13 and the robot controller 10 are integrated with each other, the robot controller 10 functions as the data collector 13 through cooperation between the hardware and software included in the robot controller 10.

The collected data collected by the data collector 13 includes, as described above, state information and operation information. The state information indicates the ambient environment data of the robot 11. The operation information reflects the operation force by the operator corresponding to the ambient environment data around the robot 11. In other words, the collected data is time series data indicating a series of state and operation information obtained when the operator continuously operates the operation device 12 to make the robot 11 perform a certain work (or a part of the work). That is, the data collector 13 collects each of the state information and each of the operation information in relation to time. The state information and the operation information includes measured values based on detection values obtained by the camera 11c, the operation force detection sensor 12a, and the like.

The learning device 3 includes at least one known computer. The computer belonging to the learning device 3 includes, for example, a GPU, a ROM, a RAM, an HDD, and the like. The HDD or the like stores an application for machine learning.

The learning device 3 constructs a learning model used in the robot system 1, by machine learning (for example, supervised learning). The learning device 3 constructs the learning model by machine learning on the training data screened by the training data screening device 2 from the collected data collected by the data collector 13.

This training data includes, for example, ambient environment data (i.e., state information) that at least reflects the work state of the robot 11 and the operation force (i.e., operation information) associated with the ambient environment data.

The learning model is, for example, a neural network with a general configuration including an input layer, hidden layers, and an output layer. Each layer includes a plurality of units that simulate brain cells. The hidden layers are located between the input layer and the output layer. The hidden layer includes an appropriate number of intermediate units. The sensor information (training data) input to the learning device 3 flows through the input layer, the hidden layers, and the output layer in that order. The number of the hidden layers is determined as appropriate. The format of the learning model is not limited to this and is arbitrary.

In this model, the data input to the input layer is sensor information reflecting the ambient environment data described above. The data output by the output layer is the estimated result of detection values of the operation force detection sensor 12a. This means, in effect, the estimated operating force by the operator. Therefore, the data output by the output layer represents the operation of the operator estimated by the model.

Each input unit is connected to each intermediate unit by a path through which information flows. Each intermediate unit is connected to each output unit by a path through which information flows. In each path, the influence (weight) of the information of upstream unit on the information of downstream unit is set.

During the training phase of the model, the learning device 3 inputs sensor information to the model and compares the operation force output from the model with the operation force by the operator. The learning device 3 updates the model by updating the above weights using, for example, the error back propagation method which is a known algorithm, so that the error obtained by this comparison becomes smaller. Since the learning model is not limited to a neural network, updating the model is also not limited to the error back propagation method. For example, a SOM (Self-organizing maps) that is a known algorithm can also be used to update the model. The learning is achieved by continuously performing such a process.

The learning model constructed by machine learning on the training data in the learning device 3 is implemented, for example, in the robot controller 10 of the robot system 1. The learning model is used, for example, for the autonomous operation of the robot 11 or the like. The learning model implemented in the robot controller 10 operates in the inference phase and outputs, in response to input the ambient environment data, an estimate of the operation force by the operator corresponding to the ambient environment data.

Next, with reference to FIGS. 2 through 7 and the like, the training data screening device 2 and the screening of the training data from the collected data by the training data screening device 2 will be described in detail.

The training data screening device 2, as shown in FIG. 1, including a data evaluation model 20, a data evaluator 21, a memory 22, a presentation device (evaluation presenter) 23, an input device (instruction receiver) 24, and a training data screener 25.

The training data screening device 2 includes a known computer. The computer includes, for example, a processor, a memory, and a communication unit. The processor is a microcontroller, a CPU, an MPU, a PLC, a DSP, an ASIC, an FPGA, or the like. The memory is a ROM, a RAM, an HDD, or the like. The communication unit can communicate with external devices.

The memory 22 of the training data screening device 2 is realized by the HDD or the like of the computer. The memory 22 stores programs executed by the processor, evaluated data as described below, and the like. The cooperation of the above hardware and software allows the computer to function as the data evaluator 21 and the training data screener 25. The memory 22 performs the processes included in a storing step.

The data evaluation model 20 has the same structure as the learning model described above. The data evaluation model 20 is constructed by machine learning on at least a part of the collected data collected by the data collector 13. However, the data evaluation model 20 is not limited to this. The data evaluation model 20 may be constructed by machine learning on, for example, operation history data from another robot system 1. When the data evaluation model 20 is constructed by machine learning on the operation history data of another robot system 1, the robot 11 in the other robot system 1 corresponds to the machine to be controlled.

The collected data to be machine-learned by the data evaluation model 20 is classified into a plurality of groups using a known clustering method, for example, an NN method, a K-Means method, self-organizing maps or the like. A clustering method is a method for learning regularities of distribution from a large number of data to automatically obtain a plurality of clusters, which are groups in each of which the data has similar characteristics to each other. The classification of collected data into how many clusters can be determined as appropriate. Classification of collected data may be performed using automatic classification methods other than clustering methods.

Figure 2:
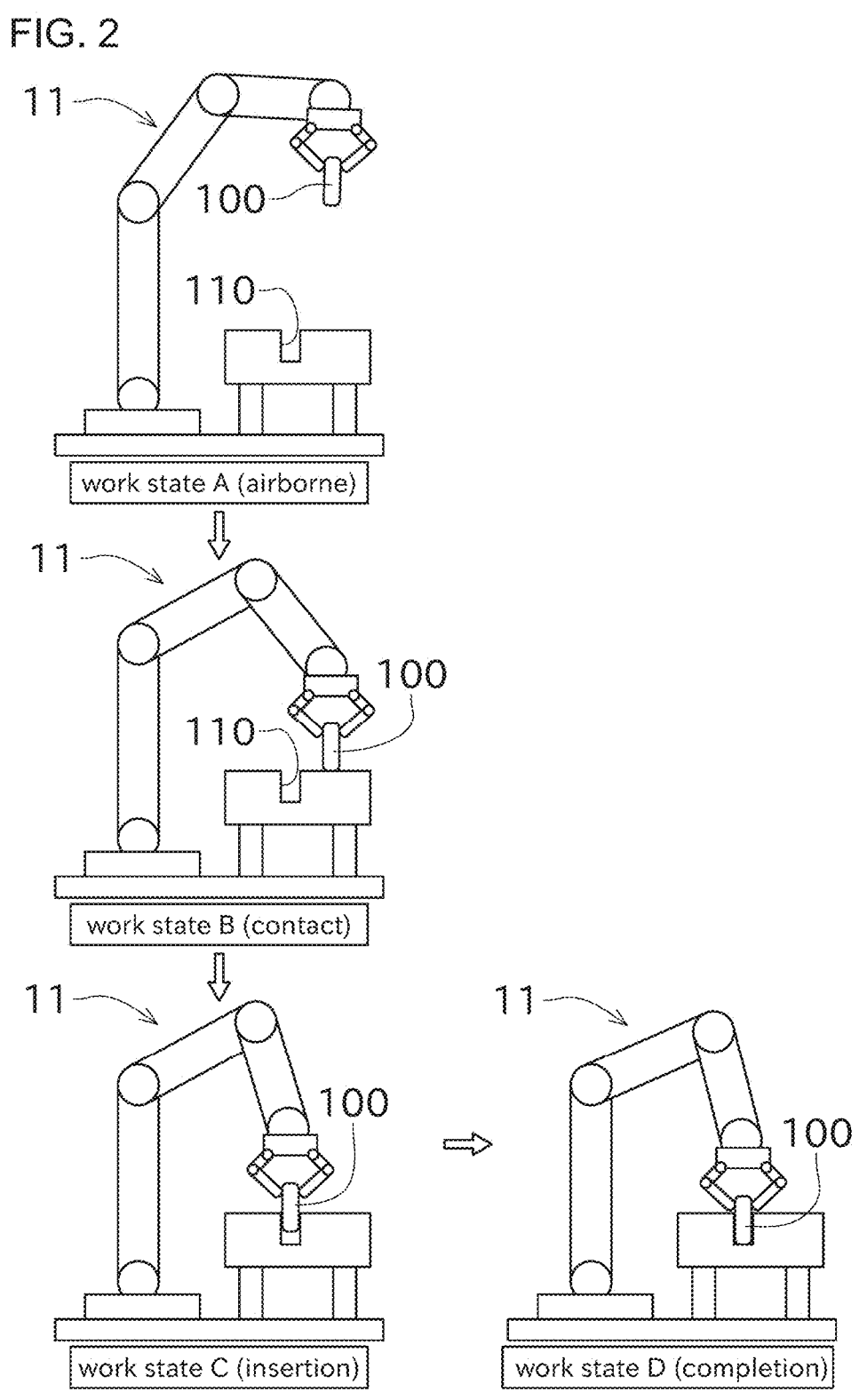

In this embodiment, for example, the collected data concerning a series of operations collected by the data collector 13 is classified for each operation by the operator (reference operation) that corresponds the work state. Specifically, as shown in FIG. 2, when a series of operations to place a workpiece 100 into a recess 110 are performed by a robot 11, the series of operations can be classified, for example, into four work states: airborne, contact, insertion, and completion.

In a work state A (airborne), the robot 11 holds the workpiece 100 and makes it position above the recess 110. In a work state B (contact), the robot 11 holds the workpiece 100 and make it be in contact with the surface where the recess 110 is formed. In a work state C (insertion), the robot 11 inserts the workpiece 100 held by the robot 11 into the recess 110. In a work state D (completion), the workpiece 100 held by the robot 11 is completely inserted into the recess 110.

Thus, the series of operations by the robot 11 is classified for each process, into the four work states. When the work of the robot 11 progresses correctly, the work state transitions in the following order: the work state A (airborne), the work state B (contact), the work state C (insertion), and work state D (completion).

The data evaluation model 20 is constructed by machine learning on, for example, the combinations of the work state and the operating force in each predetermined time range. The above work states A, B, C, and D are representative, and in reality, there can be many different work states. Suppose, for example, that the operator makes the robot 11 perform the same work several times, and that a work state A1 corresponding to one set of the state information and the operation force, a work state A2 corresponding to another set of the state information and the operation force, and a work state A3 corresponding to yet another set of the state information and the operation force are collected. The operation by the operator, the situation, and the like vary. Therefore, in detail, these work states A1, A2, and A3 differ from each other. However, since the work states A1, A2, and A3 share common characteristics, they are expected to be classified in the same cluster (the cluster of work state A).

However, the data evaluation model 20 is not limited to this. For example, the data evaluation model 20 may be constructed by performing machine learning with respect to a work state and the next work state that is related to that work state (i.e., the next transitioning work state), at least one set of the state information, and an operation force that is associated with this state information. This also allows learning of the order relationship between the work states (and thus corresponding operating forces).

Concerning the data evaluation model 20 of this embodiment, machine learning is performed so as to reflect the time order of the output of the operating forces, as described above. Briefly, the data evaluation model 20 learns at least one set of combination of the state information and the operation force, corresponding to each of the work state A, the work state B, the work state C, and the work state D. In addition, it learns an operation order like that the work state B appears after the work state A. This allows the data evaluation model 20 to classify the data to reflect the time series information of the operating force. That is, each of the operation forces that is associated with each work state can be reflected in the operation order.

As described above, this state information is the sensor information (work state such as a position, a velocity, a force, a moment, images, etc.) detected by the motion sensor 11*a*, the force sensor 11*b*, and the camera 11*c*. This state information may include information computed based on the sensor information (for example, values indicating changes in the sensor information over time from the past to the present).

The data evaluation model 20 constructed as described above can output the estimated reference operation corresponding to the state information associated with the input time series information.

When collected data including the state information and the operation information corresponding to time series information is input, the data evaluation model 20 of this embodiment estimates and outputs the reference operation corresponding to the input state information. In addition, the data evaluation model 20 obtains a distance value between the input operation information and the estimated reference operation, and outputs the distance value (similarity) as an evaluation value. Instead of the estimated reference operation, for example, information on the cluster to which the reference operation belongs may be output. The comparison between the output estimated reference operation and the input operation information may be performed by the data evaluator 21 instead of the data evaluation model 20.

The data evaluator 21 is used to evaluate the collected data collected by the data collector 13, using the data evaluation model 20 which has been constructed in advance as described above. The data evaluator 21 performs an evaluation on the operating information in each predetermined time range, as shown in FIG. 3. Specifically, if the evaluation value output by the data evaluation model 20 with respect to the collected data is equal to or greater than a predetermined threshold value, the data evaluator 21 assigns a label (correspondence information), indicating information of the cluster to which the reference operation output by the data evaluation model 20 belongs, to the collected data. On the other hand, if the evaluation value output by the data evaluation model 20 is less than the predetermined threshold value, the data evaluator 21 does not assign a label to the collected data. However, instead of not assigning a label, the data evaluator 21 may assign a label indicating that the data does not belong to any clusters. In the following, whether or not a label is assigned and/or the type of label assigned may be referred to as "label information". That is, the data evaluator 21 performs the processes included in a data evaluation step.

For example, when evaluating a series of collected data for a series of operations shown in FIG. 2, the data evaluation model 20 computes the similarity of the relevant components in each reference operation for the force x, the force y, the velocity x, and the velocity y included in the operation information for each predetermined time range, as shown in FIG. 3, such that the overall similarity between the operation information for each predetermined time range and the respective reference operation is determined. The data evaluation model 20 outputs the overall similarity as an evaluation value.

For each predetermined time range, the data evaluator 21 assigns a label to the operation information indicating the reference operation to which the operation information is similar, if the evaluation value output by the data evaluation model 20 for the operation information (and thus the collected data) is equal to or greater than a predetermined threshold value.

The following is a specific explanation. As shown in FIG. 3, if the operation information in the predetermined time range is similar to the reference operation corresponding to the work state A, the data evaluator 21 assigns (gives) a label of a numerical value (1) to that portion of the operation information. If the operation information in the predetermined time range is similar to the reference operation corresponding to the work state B, the data evaluator 21 assigns a label of a numerical value (2) to that portion of the operation information. If the operation information in the predetermined time range is similar to the reference operation corresponding to the work state C, the data evaluator 21 assigns a label of a numerical value (3) to that portion of the operation information. If the operation information in the predetermined time range is similar to the reference operation corresponding to the work state D, a label of a numerical value (4) is assigned to that portion of the operation information. The above allows continuous changes in the operation information (and thus in the detection value of the operation force detection sensor 12*a*) to be understood as changes in the label information.

In the following description, data to which a label of numerical value is assigned may be referred to as "tentative selection target data" and data to which the label of numerical value is not assigned may be referred to as "tentative selection excluded data". The collected data that has been evaluated by the data evaluator 21 is referred to as "evaluated data". This evaluated data includes one or both tentative selection target data and tentative selection excluded data.

Thus, the labels are assigned to the information contained in the collected data, for each predetermined time range. By grouping the portions of the collected data according to the assigned labels, as shown in FIG. 3, the collected data can be treated as blocks corresponding to each reference operation. This makes it easier to extract only the data (block) that represents portion for which the operation is valid from the collected data for the series of operations.

That is, in the evaluated data, the portion in which the time series information is continuous and the label information is the same is treated as one coherent block. As a result, in general terms, as in the series of collected data shown in FIGS. 4, 5, and the like, for example, the data sequence can be represented as blocks (ranges) with the numerical label and blocks (ranges) without numerical label, arranged in order according to their time series information.

The collected data is evaluated while maintaining time series information. Thus, the collected data of a series of operations that includes operating information similar to a plurality of reference operations can be easily distinguished according to whether or not they have the specified operation order of that series of operations (for example, 1 (A)->2 (B)->3 (C)->4 (D) as shown in FIG. 3). That is, even if each data collected twice has the same set of multiple reference operations that are similar to each other, if they have different operation orders corresponding to the operation information, each collected data can be treated as belonging to different clusters.

The data evaluator 21 transmits the operation information for the collected data to which the label information has been assigned as described above (including a portion of the collected data to which the numerical label has not been assigned) to the presentation device 23. This operating information corresponds to evaluated operating information.

The presentation device 23 shown in FIG. 1 is a dot matrix display such as a liquid crystal or organic EL. The presentation device 23 displays the evaluated data evaluated by the data evaluator 21, the label information of the collected data, and the like, so that an evaluation result by the data evaluator 21 is presented to the operator. The presentation device 23 is located near the operation device 12, for example. The presentation device 23 can also display image signals, information about the work performed by the robot system 1, or the like.

Specifically, for example, the presentation device 23 can visually display the operation information (for example, the operation force) included in the collected data in the form represented by a graph, as shown in FIG. 4. In addition, the presentation device 23 can display a data portion in which the time series information is continuous and the same numerical label is assigned as a single block. This allows operators to check the operating information more intuitively.

In addition, the presentation device 23 may display a data portion in which the numerical label is not assigned, with a "?" symbol to highlight the data portions. Although not shown in FIG. 4, data portions that are assigned different numerical values and/or those labels may be displayed in different colors in the presentation device 23. In the presentation device 23, the operation information (for example, the operation force) included in the collected data may be displayed in the form of a graph or the like so that it can be compared with the operation information (for example, the operation force) of the reference operation.

The input device 24 receives an instruction from the operator regarding whether or not to adopt the evaluated operating information presented in the presentation device 23 as the training data. The input device 24 is configured including a key, a mouse, a touch panel, or the like, which can be operated by the operator. According to the input by the operator to the input device 24, the training data screening device 2 assigns information regarding acceptance or rejection as the training data to the evaluated operation information, in the form of a flag for example. The tentative selection target data or the tentative selection excluded data to which the acceptance or rejection information is assigned by the operator is stored in the memory 22 as selection completion data.

Immediately after the operator has the robot 11 perform the series of operations by operating the operation device 12, the training data screening device 2 of this embodiment can make the presentation device 23 promptly display the evaluation result for the collected data of the series of operations.

Thus, in this embodiment, the operator can instruct by the input device 24, the acceptance or rejection regarding whether the operations performed immediately before are to be used as the training data for machine learning, at the site where the operations were performed while the feeling of the operations is still in him or her.

When the operator operates the operation device 12, a case may arise in which he/she is not satisfied with his/her operations, such as he/she should have operated the device more strongly/weakly, should have started the operations earlier/later, or the like. In this case, the operator can reject to adopt the collected data as the training data and redo the operations until he/she is satisfied. In this way, a cycle including collecting data and determining on acceptance or rejection as the training data can be repeated in an agile and efficient manner. Thus, a wealth of training data that is easy for operators to accept can be obtained in a short period of time.

The evaluation of data by the data evaluator 21 can be completed quickly and automatically after data collection, by using the data evaluation model 20 which has already been constructed by machine learning. Thus, the operator can use the presentation of the evaluation result as an aid even when acceptance or rejection is determined in substantial real time as described above.

The above allows the operator to limit the collected data to be used in the training data as intended. In other words, inappropriate collected data can be excluded before the collected data are supplied for the training phase of the learning model. By adopting or rejecting the collected data at an early stage, the number of cases in which undesirable collected data are machine-learned can be reduced. As a result, the training time required to construct a learning model that produces the intended output can be reduced.

The presentation of the evaluation result and the instruction for acceptance or rejection are not limited to being done in real time and on the spot. The training data screening device 2 may, for example, present the evaluation results for a plurality of collected data corresponding to the operations performed by the operator within the predetermined period of time in a compiled form to the operator at a different location.

In the training data screening device 2 of this embodiment, the operator can use the input device 24 to select the collected data (evaluated data) collected for a series of operations in units of the collected data and to instruct the operator to accept or reject the selected data as the training data. However, the operator can also select only a portion of the collected data and instruct to accept or reject the portion as the training data.

Figure 5:
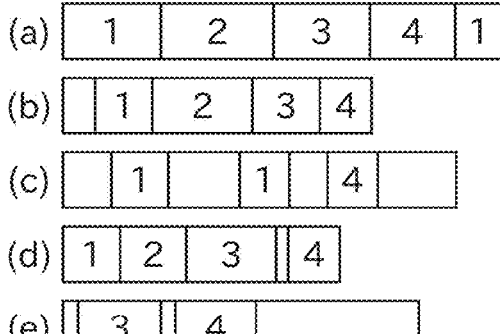
FIG. 5 is a diagram showing an example of data presented and screened by an operator.
Figure 5:
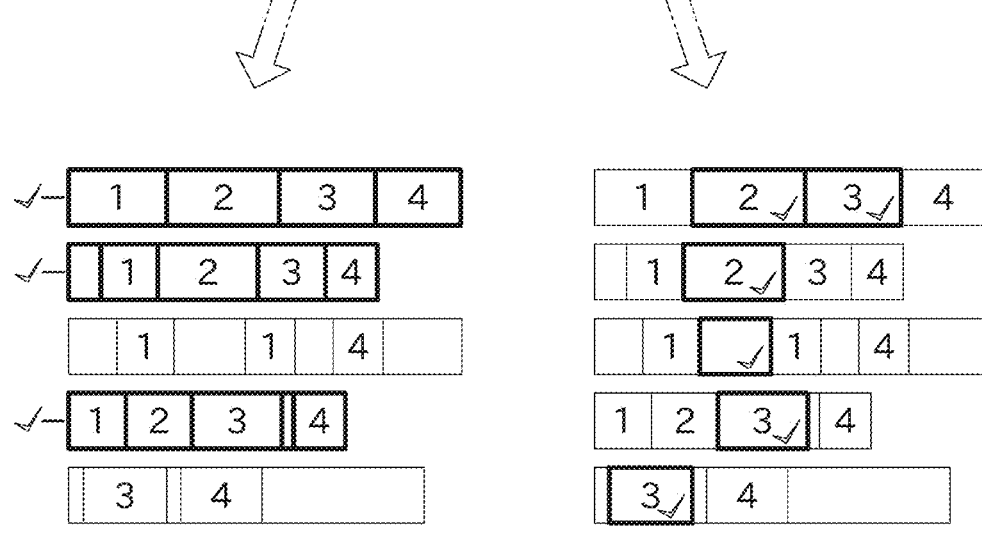

For example, an upper part of FIG. 5 shows five pieces of operating information (a) through (e), each corresponding to the evaluated data. As shown in a lower left part of FIG. 5, the operator can select three pieces of operation information (a), (b), and (d) out of the five pieces of operation information and instruct to adopt them as the training data.

In the pieces of operation information (b) and (d) shown in FIG. 5, blocks of the tentative selection excluded data are included. However, the operator can select such data as valid data for a series of operations by instructing.

Alternatively, as shown in a lower right part of FIG. 5, the operator can select data in units of data blocks contained in each of the operation information (a) through (e) (for example, portions corresponding to certain reference operation) and instruct to adopt them as the training data.

Figure 6:
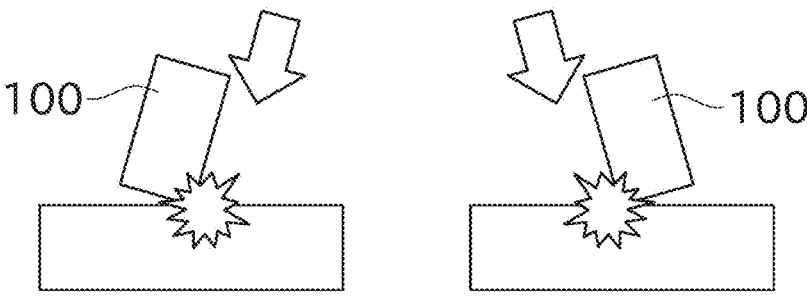
FIG. 6 is a diagram showing an example of how the robustness of data screened from collected data with respect to a work state can be improved.
Figure 6:
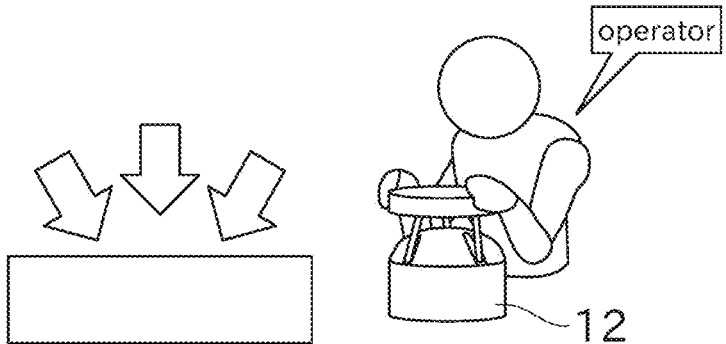

For example, as shown in FIG. 6, in the work state B, the workpiece 100 held by robot 11 is brought into contact with the surface on which the recess 110 is formed, there may be a case where the lower left part of the workpiece 100 contacts the surface first, and a case where the lower right part contacts it first. Which of the left lower part or the right lower part of the workpiece 100 contacts the surface first can be any for this work state B, but in terms of the detection values detected by the sensor, the two cases are to be the respective data. Therefore, it is not a small possibility that those cases will be treated as different operations in the data evaluation model 20.

For example, the operation information (a) shown in FIG. 5 is the case where the lower left part of the workpiece 100 contacts the surface first, and the operation information (c) is the case where the lower right part of the workpiece 100 contacts the surface first. In those cases, in the evaluation of the data evaluator 21, for example, it is conceivable that a label of numerical value (2) is assigned to the corresponding data block in the operation information (a), and a label is not assigned to the corresponding data block in the operation information (c).

In this regard, in the training data screening device 2 of this embodiment, the operator, by operating the input device 24, can select the data block that is in the operation information (c) shown in FIG. 5 and to which the label is not assigned, and instruct that the selected data block is the operation corresponding to the numerical value (2) label. This allows the training data screening device 2 to recognize, without omission, variations in the collected data that are valid operations in the same work state. For example, with respect to the work state B shown in FIG. 6, the operator can instruct the training data screening device 2 to adopt both of the operation information for each case where the workpiece 100 contacts the surface where the recess 110 is formed from different directions, as the training data. Thus, the robustness of the training data screened by the training data screening device 2 can be improved.

As described above, the training data screening device 2 can present the large amount of collected data with mechanically-performed evaluation information (labels) added to the data to be selected by the operator. This allows the operator to efficiently select appropriate data to be used as the training data for machine learning.

Next, an assignment of the label that signifies a new operation will be described.

Due to changes in the environment or the like, there may be a need to learn a new operation that was not previously intended to be performed by the robot 11. In this case, the operator operates the operation device 12 to make the robot 11 perform a series of operations including this operation. The state information and the operation information at this time is obtained as the collected data by the data collector 13. In the following, consider the case where, in the operation information (c) shown in FIG. 5, a portion corresponding to the new operation in the collected data corresponds to the data block between the two blocks to which the label (1) are assigned. Since the operation is new, this data block is not labeled by the data evaluator 21.

When this operation information (c) is presented at the presentation device 23, the operator operates the input device 24 to select the data block that has not been labeled, and instruct that the data block is to be learned as a new reference operation. The training data screening device 2 then assigns to the corresponding tentative selection excluded data a label with a numerical value (for example, 5) that is not used in the tentative selection target data. As a result, an additional label with a numerical value (5) is assigned to the data in the block. Furthermore, the operator can instruct by operating the input device 24 to adopt the data block with the new label as the training data.

In this case, when the learning model learns the training data, the data labeled with the above numerical value (2) and the data labeled with the numerical value (5) can be treated as the operating information for the same work state B.

Specifically, with respect to a series of operations as shown in FIG. 2, a certain collected data (label order 1->2->3->4) and a certain collected data (label order 1->5->3->4) are considered. The two collected data have similar state information and similar operation order. Therefore, in the learning model, both the data labeled with the numerical value (2) and the data labeled with the numerical value (5) can be easily classified into the cluster corresponding to the work state B.

The training data screener 25 is used to screen the training data from the selection completion data stored in the memory 22 to construct the learning model used in the robot system 1. The training data are screened in various ways for different purposes. For example, if the user wants the learning model to learn the series of operations shown in FIG. 2, the training data screener 25 screens, from the selection completion data that have been instructed to be adopt as the training data, the data to which the labels of numerical values (1) through (4) are assigned, and outputs as the training data. For example, if the user wants the training model to learn additionally with respect to the reference operation for the work state C, the training data screener 25 extracts, from the selection completion data that have been instructed to be adopted as the training data, the block of a data portion to which the label of numerical value (3) are assigned, and outputs as the training data.

Figure 7:
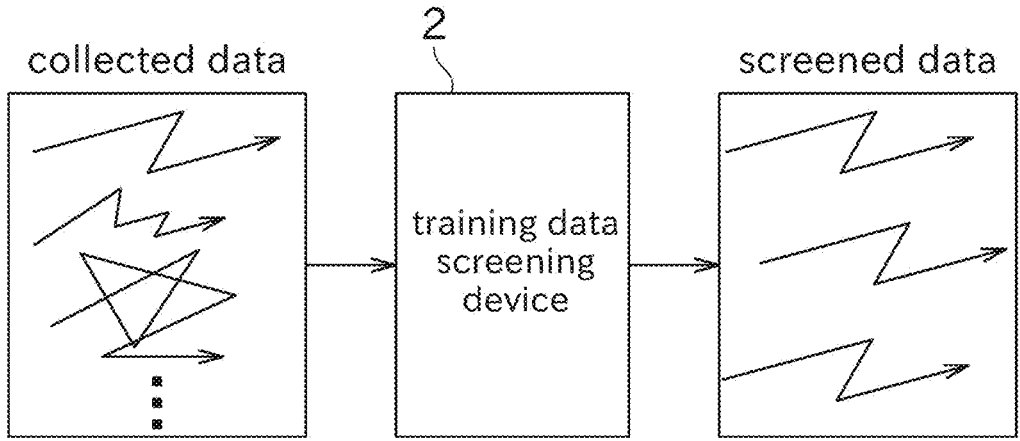
FIG. 7 is a diagram illustrating one of the effects of the training data screening device.

That is, as shown in FIG. 7, the training data screening device 2 can screen only the training data to be learned by the learning model from the plurality of collected data for multiple types of work. The training data screener 25 performs the processes included in the training data screening step as described above.

This allows for efficient screening of the training data for building the learned model. It also avoids the screening of unpreferable data as the training data. As a result, the time it takes for the learning model to produce output as intended by the operator can be reduced.

As explained above, the training data screening device 2 in this embodiment screens the training data for constructing the learning model by machine learning from the collected data collected by the data collector. The training data screening device 2 includes a data evaluation model 20, a data evaluator 21, a memory 22, and a training data screener 25. The data evaluation model 20 is constructed by machine learning on at least a part of the collected data, or by machine learning on data different from the collected data. The data evaluator 21 evaluates the input collected data using the data evaluation model 20. The memory 22 stores the evaluated data, which is the collected data evaluated by the data evaluator 21. The training data screener 25 screens the training data for constructing the learning model from the evaluated data stored by the memory 22 by the instruction of the operator to whom the evaluation result of the data evaluator 21 is presented.

This makes it easy to prepare the training data including preferred data for machine learning by screening the training data from the collected data using the data evaluation model 20. This reduces the time required to construct the learning model.

The training data screening device 2 includes the presentation device 23 and the input device 24. The presentation device 23 presents the evaluation result of the data evaluator 21 to the operator. The input device 24 receives the instruction from the operator regarding whether or not to screen the evaluated data as the training data. The training data screener 25 screens the training data for building a learning model based on the instruction input to the input device 24.

This allows the training data to be an even more appropriate collection of data, since the training data is screened based on the instruction of a human (preferably the operator himself/herself who performed the operation). In addition, by referring to the evaluation result by the data evaluation model 20, the operator can easily determine whether the collected data should be used as the training data or not.

In the training data screening device 2, the collected data includes time series information of measured values based on detection values obtained by at least one sensor provided with the robot system 1. The data evaluator 21 evaluates the collected data for each partial time series information, which is time series information corresponding to a part of time of the time series information of the detection values, using the data evaluation model 20.

This makes it easier to understand a series of operations as a sequence of basic operations arranged in an appropriate order, since the data is evaluated for each appropriate unit in the collected data. By using the evaluation result, screening of the training data becomes more accurate. In addition, by using the parts corresponding to the basic operations as the unit for screening the training data, machine learning can be performed while efficiently using the collected data.

In the training data screening device 2, the data evaluation model 20 is constructed to output an evaluation value corresponding to each of the plurality of reference operations, which are subdivisions of the operations performed by the operator, when the partial time series information is input. If the best evaluation value among the evaluation values output by the data evaluation model 20 with respect to each of the plurality of reference operations when the partial time series information is input is better than the threshold value, the data evaluator 21 assigns the label to the collected data indicating that it is evaluated that the partial time series information corresponds to the reference operation with the best evaluation value, and stores the collected data with the label in the memory as the evaluated data.

This makes it easy to distinguish data that has been given a good evaluation by the data evaluator 21.

In the training data screening device 2, the evaluated data is presented for screening by the operator from the evaluated data in a manner in which the label as the evaluation result is assigned.

This allows the operator to easily check which data has been given a good evaluation by the data evaluator 21.

In the training data screening device 2, the evaluated data is presented for screening by the operator from the evaluated data so that each range of the partial time series information to which the label as the evaluation result is assigned can be distinguished.

This allows the operator to easily check which a portion of the time series information representing a series of operations is evaluated as good.

In the training data screening device 2 of this embodiment, the evaluated data including, in addition to the range in which the best evaluation value among the evaluation values output by the data evaluation model 20 with respect to each of the plurality of reference operations is better than the threshold value, the range in which the best evaluation value is not better than the threshold value is presented for screening by the operator from the evaluated data.

This allows the range in which a good evaluation is not given to be also confirmed by the operator. Thus, for example, the operator can use it as a clue to verify which part of his/her series of operations was not good.

In the training data screening device 2 of the present embodiment, the operator can specify the range in which the best evaluation value among the evaluation values output by the data evaluation model 20 with respect to each of the plurality of reference operations is not better than the threshold value, and the operator can assign to the specified range, the label indicating an operation that is not included in the plurality of reference operations.

This allows a new reference operation to be introduced and then the training data to be screened.

In the training data screening device 2, the evaluated data is visually presented for screening by the operator from the evaluated data in the form of the graph representing the detection values by the sensor or information based on the detection values.

This makes it easier for the operator to check the evaluated data.

In the training data screening device 2, the training data screener 25 can screen the training data from the evaluated data for each range of the partial time series information to which the label has been assigned as the evaluation result.

This makes it possible to easily extract and screen the part of the evaluated data as the training data, thus enabling machine learning while efficiently using the collected data.

While some preferred embodiments of the present invention have been described above, the foregoing configurations may be modified, for example, as follows.

The presentation device 23 is not limited only to visual display. The presentation device 23 can also present the operator with an evaluation of the operation information, for example, by auditory presentation indicated by different sound effects depending on the goodness or badness of the evaluation values, or by force presentation as feedback such as vibration to the operation device 12.

On the history of collected data evaluated by the data evaluator 21 and stored in the memory 22, instruction information about the respective goodness or badness of the data can be input by the operator by operating the input device 24.

In the aforementioned embodiment, the operator makes a determination whether or not to adopt the evaluated data as the training data with the assistance of the presentation of the result of the evaluation performed by the data evaluator 21. However, the acceptance or rejection of the evaluated data as the training data may be automatically determined by a program (including the case where artificial intelligence is used) instead of the operator. In this case, the presentation device 23 for presenting the data to the operator and the input device 24 for receiving the instruction from the operator can be omitted.

In the learning device 3, after building a learning model by machine learning the training data screened by the training data screening device 2, this learning model can be used as the data evaluation model 20.

The robot 11 can be configured as a medical robot or the like as well as an industrial robot.

The training data screening device 2 may screen not only the training data for the construction of a learning model for controlling a robot, but also for the construction of a learning model for the automatic operation of a vehicle or plant.

The data collector 13 may be provided in the training data screening device 2 instead of the robot system 1.

The data evaluation model 20 of the training data screening device 2 evaluates the collected data. However, the data evaluation model 20 may be also used to evaluate the output of a learning model constructed by machine learning the training data screened by the training data screening device 2.

For example, during data collection, information obtained by the robot 11 side may be presented in real time to the operator who performs the remote operations. Information presented to the operator in this manner may be subject to collection by the data collector 13.

As an example of presenting information to the operator, during data collection, the robot controller 10 may drive the robot 11 according to the operation of the operation device 12 by the operator, while the operation device 12 can be driven such that the reaction force received by the robot 11 from its surroundings is transmitted. Accordingly, an interactive operation is achieved. The operator can remotely operate the robot 11 using the operation device 12 in real time while feeling the sense of force presented in a pseudo manner through the operation device 12.

As another example of presenting information to the operator, during data collection, the image of the camera 11c included in the robot system 1 may be displayed on an appropriate display located near the operator in real time.

DESCRIPTION OF THE REFERENCE NUMERALS

1 Robot system (machine to be controlled)
2 Training data screening device
20 Data evaluation model
21 Data evaluator
22 Memory
23 Presentation device (evaluation presenter)
24 Input device (instruction receiver)
25 Training data screener

The invention claimed is:

1. A training data screening device for screening training data for constructing a learning model by machine learning from collected data collected by a data collector, the training data screening device comprising:
a data evaluation model constructed by machine learning on at least a part of the collected data, or by machine learning on data different from the collected data;
a data evaluator that evaluates the input collected data using the data evaluation model;
a memory for storing evaluated data, which is the collected data evaluated by the data evaluator; and
a training data screener that screens the training data for constructing the learning model from the evaluated data stored by the memory by an instruction of an operator to whom an evaluation result of the data evaluator is presented, or automatically screens the training data based on the evaluation result,
wherein
the collected data includes time series information of measured values based on detection values obtained by at least one sensor provided with a machine to be controlled,
the data evaluator evaluates the collected data for each partial time series information being the time series information corresponding to a part of time of the time series information of the detection values, using the data evaluation model, and
the data evaluation model is constructed to output an evaluation value corresponding to each of a plurality of reference operations, which are subdivisions of the operations performed by the operator, when the partial time series information is input.

2. The training data screening device according to claim 1, comprising:
an evaluation presenter that presents the evaluation result of the data evaluator to the operator; and
an instruction receiver that receives an instruction from the operator regarding whether or not to screen the evaluated data as the training data, wherein the training data screener screens the training data for constructing the learning model based on the instruction input to the instruction receiver.

3. The training data screening device according to claim 1, wherein if the best evaluation value among the evaluation values output by the data evaluation model with respect to each of the plurality of reference operations when the partial time series information is input is better than a threshold value, the data evaluator assigns correspondence information to the collected data, indicating that it is evaluated that the partial time series information corresponds to the reference operation with the best evaluation value, and stores the collected data with the correspondence information in the memory as the evaluated data.

4. The training data screening device according to claim 3, wherein the evaluated data is presented for screening by the operator or used for automatic screening from the evaluated data, in a manner in which the correspondence information as the evaluation result is assigned.

5. The training data screening device according to claim 4, wherein the evaluated data is presented for screening by the operator from the evaluated data so that each range of the partial time series information to which the correspondence information as the evaluation result is assigned can be distinguished.

6. The training data screening device according to claim 5, wherein the evaluated data including, in addition to the range in which the best evaluation value among the evaluation values output by the data evaluation model with respect to each of the plurality of reference operations is better than the threshold value, the range in which the best evaluation value is not better than the threshold value is presented for screening by the operator from the evaluated data.

7. The training data screening device according to claim 6, wherein the operator can specify the range in which the best evaluation value among the evaluation values output by the data evaluation model with respect to each of the plurality of reference operations is not better than the threshold value, and the operator can assign to the specified range, correspondence information indicating an operation that is not included in the plurality of reference operations.

8. The training data screening device of claim 5, wherein the evaluated data is visually presented for screening by the operator from the evaluated data in the form of a graph representing the detection values by the sensor or information based on the detection values.

9. The training data screening device of claim 5, wherein the training data screener can screen the training data from the evaluated data for each range of the partial time series information to which the correspondence information has been assigned as the evaluation result.

10. A robot system comprising:

a learning model constructed by machine learning using the training data screened by the training data screening device according to claim 1; and a robot that performs work based on the output of the learning model.

11. A training data screening method for screening training data for constructing a learning model by machine learning from collected data collected by a data collector, the training data screening method comprising:

a data evaluation step for evaluating the input collected data using a data evaluation model constructed by machine learning on at least a part of the collected data, or by machine learning on data different from the collected data;

a storing step for storing evaluated data, which is the collected data evaluated in the data evaluation step; and a training data screening step for screening the training data for constructing the learning model from the evaluated data stored in the storing step by an instruction of an operator to whom an evaluation result in the data evaluation step is presented, or automatically screening the training data based on the evaluation result, wherein the collected data includes time series information of measured values based on detection values obtained by at least one sensor provided with a machine to be controlled, the data evaluation step evaluates the collected data for each partial time series information being the time series information corresponding to a part of time of the time series information of the detection values, using the data evaluation model, and the data evaluation model is constructed to output an evaluation value corresponding to each of a plurality of reference operations, which are subdivisions of the operations performed by the operator, when the partial time series information is input.

12. The training data screening method according to claim 11, wherein the data evaluation step includes assigning a label if an evaluation value is equal to or greater than a predetermined threshold value.

* * * * *